March 26, 1940.  G. P. BENTLEY ET AL  2,195,355
IMPLEMENT TRIPPING DEVICE
Filed Nov. 10, 1938  2 Sheets-Sheet 1

Inventor
G. P. Bentley
John A. Peterson
By Clarence A. O'Brien
and Hyman Berman
Attorneys March 26, 1940.   G. P. BENTLEY ET AL   2,195,355
IMPLEMENT TRIPPING DEVICE
Filed Nov. 10, 1938   2 Sheets-Sheet 2

Inventor
G. P. Bentley
John A. Peterson
By Clarence A. O'Brien
and Hyman Berman
Attorneys Patented Mar. 26, 1940

2,195,355

UNITED STATES PATENT OFFICE 2,195,355

IMPLEMENT TRIPPING DEVICE

Gjermund P. Bentley and John A. Peterson, Decorah, Iowa

Application November 10, 1938, Serial No. 239,874

2 Claims. (Cl. 74—2)

This invention relates to an implement tripping device and has for the primary object the provision of a device of this character which is in the form of an attachment easily installed on a tractor and connected to the trip mechanism of the implement drawn by said tractor, so that the operator of the tractor may at any time desired actuate the trip mechanism from a seated position on the tractor through the use of the foot, leaving the hands free for the control of the tractor and which includes means for automatically separating should the implement become disconnected from the tractor obviating any possibility of breaking the attachment and the latter may be conveniently rearranged for operating the power lift of the tractor when desired.

With these and other objects in view, the invention consists in certain novel features of construction, combination and arrangement of parts to be hereinafter more fully described and claimed.

For a complete understanding of our invention, reference is to be had to the following description and accompanying drawings, in which Figure 1 is a fragmentary side elevation, partly in section, showing a portion of a tractor and an implement drawn thereby and equipped with an attachment constructed in accordance with the present invention.

Figure 1:
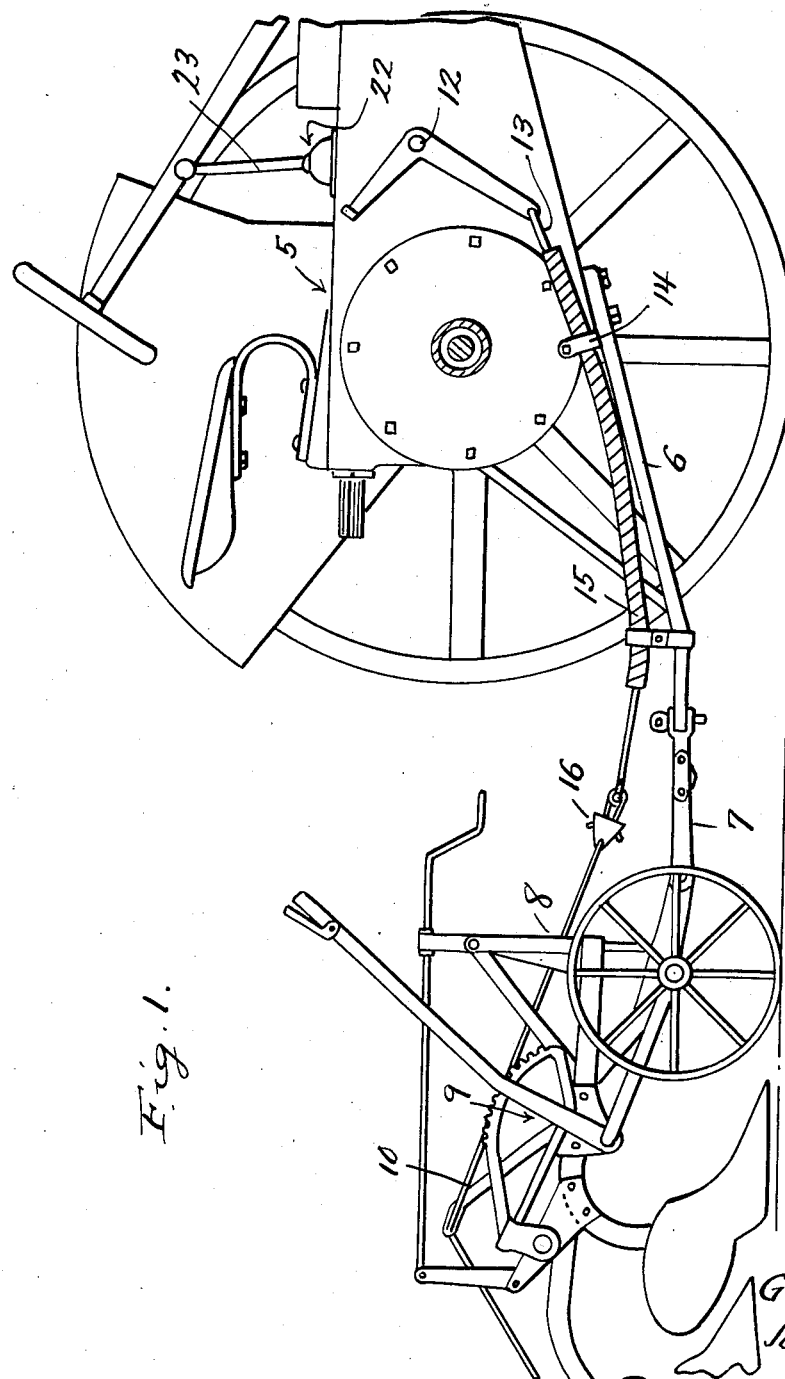

Referring in detail to the drawings, the numeral 5 indicates a portion of a well known type of tractor, the draw bar being indicated by the character 6 and connected to a draw bar 7 of a cultivating implement 8 of conventional construction and which includes a trip mechanism 9 having an actuating lever 10. The hitch between the tractor and cultivating implement is usually of the type which is automatically releasable should the implement engage with an obstruction so as to uncouple from the tractor to prevent breakage or damage either to the implement or the tractor.

With the present invention installed on the tractor and the implement it is possible for the operator of the tractor from a seated position to operate the trip mechanism 9 through the use of the foot.

The present invention consists of a foot pedal 11 pivotally mounted on the tractor, as shown at 12, and has connected thereto a flexible element 13, which extends rearwardly from the tractor and is suitably secured to the lever 10 of the trip mechanism 9. Mounted on the tractor or the draw bar 6 thereof through the use of suitable clamps 14 is a flexible tube or housing 15 through which the flexible element 13 extends and is guided in its movement by said tube or housing.

The flexible element 13 is preferably constructed in sections, one of which is connected to the foot pedal and the other to the lever 10 of the trip mechanism 9. The adjacent ends of the sections are detachably connected by a coupler 16 which will automatically release the sections should the implement and tractor separate to obviate any possibility of breaking the flexible element 13 or any of the other parts of the present invention.

The coupler 16 consists of a substantially U-shaped yoke 17 which has one of the sections of the flexible element connected thereto and is provided with a slot 18 to receive the arm portions 19 of a spring clip 20. The arm portions 19 have their free end portions arranged in diverging relation. The arm portions are connected by a coiled portion 21 providing necessary tension to the arm portions which tends to spread said arm portions and also to provide an eye to which the other section of the flexible element 13 is connected. The arm portions 19 are contracted and inserted through the slot 18 and allowed to expand so that the diverging free end portions of said arm portions extend outwardly of the upper and lower edges of the yoke 17, thereby detachably connecting the sections of the flexible element together. The arm portions 19 fitting in the yoke as described will have sufficient bearing on said yoke as to withstand ordinary pull on the flexible element for the actuation of the trip mechanism 9 by the foot pedal. However, should separation of the implement occur from the tractor, the spring arms 19 will pull out of the yoke and thereby obviates possibility of breaking the flexible element 13 or any of the other parts of the present invention. Also the coupler 16 affords means whereby the sections of the flexible element may be separated when detaching the implement from the tractor manually as a person may readily contract the arm portions 19 of the spring clip 20 and withdraw said arms from the yoke 17, leaving one of the sections of the flexible element attached to the implement while the other section of the flexible element remains on the tractor.

Figure 2:
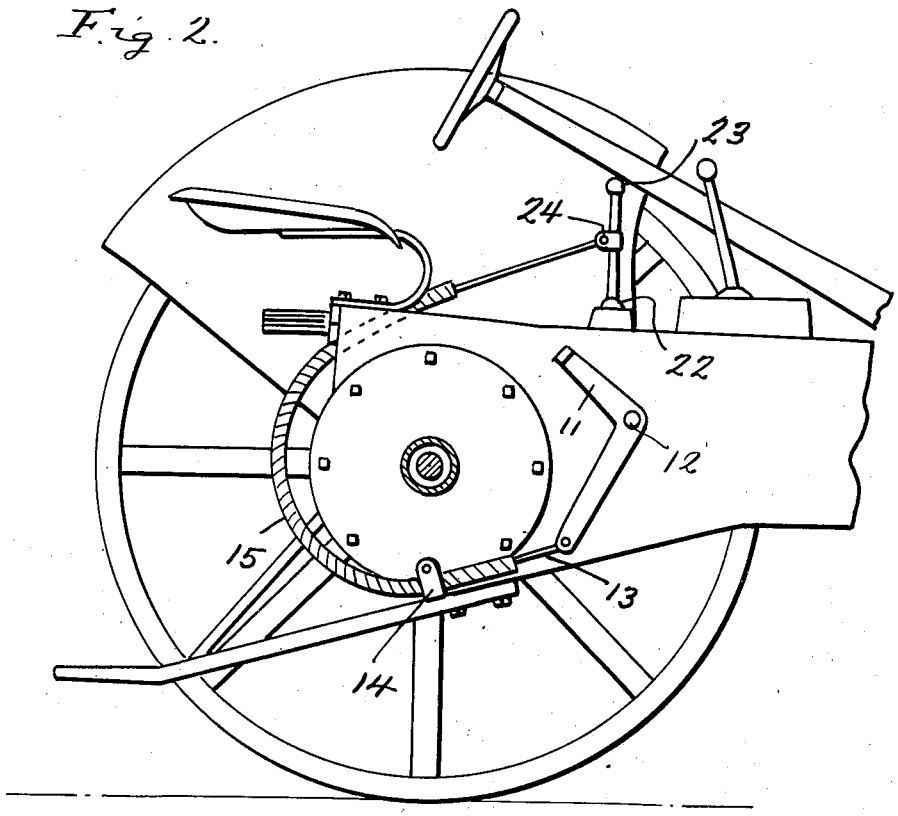
Figure 2 is a fragmentary side elevation, partly in section, showing a portion of the tractor with the attachment arranged for the operation of the power lift of the tractor.
Figure 3:
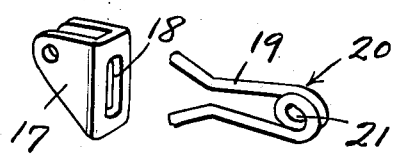
Figure 3 is an exploded perspective view showing the automatic release forming a part of the attachment.

The attachment may, at any time, be employed for operating the power life mechanism of the tractor and generally indicated by the character 22 and which includes a hand lever 23. The flexible element 13 is extended about the rear axle construction of the tractor, as clearly shown in Figure 2, and is connected to the lever 23 by a clip 24 so that the operator of the tractor through the use of the foot on the pedal 22 may move the lever 23 and bring about operation of the power lift mechanism. It is to be understood that the clamps 14 are removed from the draw bar 6 and attached to the rear axle housing of the tractor when adapting the attachment to the power lift mechanism.

Through the use of the clips it will be apparent that the present attachment can be readily attached onto the tractor through the use of bolts already on said tractor.

It is believed that the foregoing description, when taken in connection with the drawings will fully set forth the construction and advantages of this invention to those skilled in the art to which such a device relates, so that further detailed description will not be required.

What is claimed is:

1. Trip actuating means for operating a trip device on a tractor pulled cultivator and from the tractor, said means comprising a foot pedal adapted for mounting on the tractor, a flexible tubular guide adapted for mounting on the tractor, a pull cable comprising a section connected at one end to said pedal and extending through said guide, a second section connected at one end to said trip device, and a coupling between said sections including a pair of interconnected members secured to the other ends of said sections, respectively, and relatively separated under excessive pull exerted thereagainst by said sections.

2. Trip actuating means for operating a trip device on a tractor pulled cultivator and from the tractor, said means comprising a foot pedal adapted for mounting on the tractor, a flexible tubular guide adapted for mounting on the tractor, a pull cable comprising a section connected at one end to said pedal and extending through said guide, a second section connected at one end to said trip device, and a coupling between said sections including a pair of interconnected members secured to the other ends of said sections, respectively, and relatively separable under excessive pull exerted thereagainst by said sections, one of said members comprising a yoke having a slot therein, and the other member comprising a clip having curved resilient legs extending into said slot and reacting outwardly against the ends of the slot to frictionally lock to said clip.

GJERMUND P. BENTLEY.
JOHN A. PETERSON.